US009517546B2

(12) United States Patent
Panzarella et al.

(10) Patent No.: US 9,517,546 B2
(45) Date of Patent: Dec. 13, 2016

(54) ABRASIVE ARTICLES INCLUDING ABRASIVE PARTICULATE MATERIALS, COATED ABRASIVES USING THE ABRASIVE PARTICULATE MATERIALS AND METHODS OF FORMING

(71) Applicants: Tracy H. Panzarella, Norwood, MA (US); Doruk O. Yener, Wilmington, MA (US)

(72) Inventors: Tracy H. Panzarella, Norwood, MA (US); Doruk O. Yener, Wilmington, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 13/627,923

(22) Filed: Sep. 26, 2012

(65) Prior Publication Data

US 2013/0074418 A1 Mar. 28, 2013

Related U.S. Application Data

(60) Provisional application No. 61/539,236, filed on Sep. 26, 2011.

(51) Int. Cl.
*B24B 1/00* (2006.01)
*B24D 11/00* (2006.01)
*B24D 3/34* (2006.01)
*C09K 3/14* (2006.01)

(52) U.S. Cl.
CPC ............. *B24D 3/348* (2013.01); *C09K 3/1436* (2013.01); *C01P 2004/50* (2013.01)

(58) Field of Classification Search
None
See application file for complete search history.

(56) References Cited

U.S. PATENT DOCUMENTS

| 345,604 | A | | 7/1886 | Semper |
| 1,910,444 | A | | 5/1933 | Nicholson |
| 1,987,861 | A | * | 1/1935 | Milligan et al. ................ 51/308 |
| 2,049,874 | A | | 8/1936 | Sherk |

(Continued)

FOREIGN PATENT DOCUMENTS

| CA | 743715 A | 10/1966 |
| CA | 2423788 A1 | 7/2002 |

(Continued)

OTHER PUBLICATIONS

International Search Report for PCT/US2012/057376 dated Mar. 5, 2013, 2 pages.

(Continued)

*Primary Examiner* — Kaj K Olsen
*Assistant Examiner* — Ross J Christie
(74) *Attorney, Agent, or Firm* — Abel Law Group, LLP; Adam Keser

(57) ABSTRACT

An abrasive particulate material which is made of alumina crystals and a primary additive composition impregnated within the abrasive particulate material, the primary additive composition including a combination of Mg and Ca, wherein Mg and Ca are present in an additive ratio [Mg:Ca] within a range between about 1:1 and about 10:1, and a Ca amount is at least about 0.2 wt % Ca for the total weight of the abrasive particulate material.

21 Claims, 6 Drawing Sheets

(56) References Cited

U.S. PATENT DOCUMENTS

| | | | |
|---|---|---|---|
| RE20,547 E * | 11/1937 | Ridgway .................... 423/314 |
| 2,138,829 A * | 12/1938 | De Leeuw et al. ............ 51/309 |
| 2,148,400 A | 2/1939 | Crompton, Jr. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,474,544 A * | 6/1949 | McMullen .................... 501/125 |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,271,324 A * | 9/1966 | Hirschler, Jr. et al. ....... 502/331 |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,307 A | 10/1971 | Jones |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,059,417 A | 11/1977 | Ilmaier et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| RE31,725 E | 11/1984 | Walker et al. |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,643,983 A | 2/1987 | Zeiringer |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,938 A | 1/1989 | Janz et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Monroe et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,348 A | 11/1992 | Wood |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,567 A | 3/1993 | Tamamaki et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,551 A | 6/1993 | Hatanaka et al. |
| 5,215,552 A | 6/1993 | Sung |
| 5,219,462 A | 6/1993 | Bruxvoort et al. |
| 5,219,806 A | 6/1993 | Wood |

(56) References Cited

U.S. PATENT DOCUMENTS

| | | |
|---|---|---|
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,302,368 A | 4/1994 | Harato et al. |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,547,479 A | 8/1996 | Conwell et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,770,145 A | 6/1998 | Gerk et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,856,254 A | 1/1999 | Feige et al. |
| 5,863,306 A | 1/1999 | Wei et al. |
| 5,863,308 A | 1/1999 | Qi et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,106,800 A | 8/2000 | Mohri et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,194,317 B1 | 2/2001 | Kaisaki et al. |
| 6,206,942 B1 | 3/2001 | Wood |
| 6,228,134 B1 | 5/2001 | Erickson |
| 6,238,450 B1 | 5/2001 | Garg et al. |
| 6,242,854 B1 | 6/2001 | Yamamoto et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |

(56) References Cited

U.S. PATENT DOCUMENTS

| | | |
|---|---|---|
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,706,083 B1 | 3/2004 | Rosenflanz |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,814,917 B1 | 11/2004 | Watanabe et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,053,018 B2 | 5/2006 | Kanbara et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,680,036 B2 | 3/2014 | Gonzales et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0132607 A1* | 7/2004 | Wood et al. ............... 501/95.1 |
| 2004/0148869 A1 | 8/2004 | Celikkaya et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0101237 A1 | 5/2005 | Vecchiarelli et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0227000 A1* | 10/2005 | Bauer et al. ............... 427/180 |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0148653 A1 | 6/2008 | Bauer et al. |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0163362 A1 | 6/2009 | Yener |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040535 A1 | 2/2010 | Azima et al. |
| 2010/0056816 A1 | 3/2010 | Wallin et al. |
| 2010/0068974 A1 | 3/2010 | Dumm |

(56) References Cited

U.S. PATENT DOCUMENTS

| | | |
|---|---|---|
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0321567 A1 | 12/2012 | Gonzales et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat Vinuesa et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |

FOREIGN PATENT DOCUMENTS

| | | |
|---|---|---|
| CH | 685051 A5 | 3/1995 |
| CN | 1031243 A | 2/1989 |
| CN | 101200053 A | 6/2008 |
| CN | 10121779 A | 10/2008 |
| CN | 101291779 A | 10/2008 |
| CN | 101541476 A | 9/2009 |
| CN | 101745875 A | 6/2010 |
| CN | 102123837 B2 | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 982215 A | 2/1965 |
| GB | 986847 A | 3/1965 |
| JP | 53064890 A | 6/1978 |
| JP | 60-006356 U | 1/1985 |
| JP | 62002946 B | 1/1987 |
| JP | S62-65988 | 3/1987 |
| JP | 63036905 B | 7/1988 |

(56) References Cited

FOREIGN PATENT DOCUMENTS

| | | |
|---|---|---|
| JP | 3079277 A | 4/1991 |
| JP | 03-287687 | 12/1991 |
| JP | 5163060 | 6/1993 |
| JP | 5163060 A | 6/1993 |
| JP | 105163060 A | 6/1993 |
| JP | H05163060 A | 6/1993 |
| JP | 5285833 A | 11/1993 |
| JP | 6114739 A | 4/1994 |
| JP | 7008474 B2 | 2/1995 |
| JP | H0839435 A | 2/1996 |
| JP | 8259926 | 10/1996 |
| JP | H10-015832 | 1/1998 |
| JP | H1015832 A | 1/1998 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 73007750 B1 | 8/2002 |
| JP | 2003-049158 A | 2/2003 |
| JP | 2004-510873 A | 4/2004 |
| JP | 2004209624 A | 7/2004 |
| JP | 3609144 | 1/2005 |
| JP | 03609144 B2 | 1/2005 |
| JP | 8259926 A | 1/2005 |
| JP | 2006159402 A | 6/2006 |
| JP | 2006-192540 A | 7/2006 |
| JP | 2007-504088 | 3/2007 |
| JP | 2008194761 A | 8/2008 |
| JP | 5238725 B2 | 7/2013 |
| JP | 5238726 B2 | 7/2013 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02/28980 A2 | 4/2002 |
| WO | 02097150 | 12/2002 |
| WO | 03/087236 A1 | 10/2003 |
| WO | 2004071991 | 8/2004 |
| WO | 2004071991 A2 | 8/2004 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/055642 A1 | 5/2011 |
| WO | 2011/068724 A2 | 6/2011 |
| WO | 2011068724 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 20131049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/149209 A1 | 10/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2016/028683 A1 | 2/2016 |
| WO | 2016/044158 A1 | 3/2016 |
| WO | 2016/064726 A1 | 4/2016 |

OTHER PUBLICATIONS

G. R. Anstis et al., "A Critical Evaluation of Indentation Techniques for Measuring Fracture Toughness: I, Direct Crack Measurements," Am. Cer. Soc., vol. 64, p. 533.

C1327 Standard Test Method for Vickers Indentation Hardness of Advanced Ceramics, pp. 1-8.

"Investigation of Shaped Abrasive Particles vol. 1: Review of US Pat. No. 6,054,093 Apr. 25, 2000" © Apr. 2011, 5 pages.

Austin, Benson M., "Thick-Film Screen Printing," Solid State Technology, Jun. 1969, pp. 53-58.

Avril, Nicholas Joseph, "Manufacturing Glass-fiber Reinforcement for Grinding Wheels," Massachusetts Institute of Technology, 1996, 105 pgs.

Bacher, Rudolph J., "High Resolution Thick Film Printing," E.I. du Pont de Nemours & Company, Inc., pp. 576-581, date unknown.

(56) References Cited

OTHER PUBLICATIONS

Besse, John R., "Understanding and controlling wheel truing and dressing forces when rotary plunge dressing," Cutting Tool Engineering, Jun. 2012, vol. 64, Issue 6, 5 pages.
Brewer, L. et al., 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
DuPont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Graf, "Cubitron II: Precision-Shaped Grain (PSG) Turns the Concept of Gear Grinding Upside Down," gearsolutions.com, May 2014, pp. 36-44.
Vanstrum et al., Precisely Shaped Grain (PSG): 3M's Innovation in Abrasive Grain Technology, date unknown, 1 page.
DOW Machine Tool Accessories, Grinding & Surface Finishing, www.1mta.com, Nov. 2014, 72 pages.
Extended European Search Report, dated Sep. 1, 2015, 1 page.

\* cited by examiner

ABRASIVE ARTICLES INCLUDING ABRASIVE PARTICULATE MATERIALS, COATED ABRASIVES USING THE ABRASIVE PARTICULATE MATERIALS AND METHODS OF FORMING

CROSS-REFERENCE TO RELATED APPLICATION(S)

The present application claims priority from U.S. Provisional Patent Application No. 61/539,236, filed Sep. 26, 2011, entitled "Abrasive Articles Including Abrasive Particulate Materials, Coated Abrasives Using the Abrasive Particulate Materials and Methods of Forming," naming inventors Tracy H. Panzarella et al., which application is incorporated by reference herein in its entirety.

BACKGROUND

Field of the Disclosure

The following is directed to abrasive articles including abrasive particulate materials, and particularly, abrasive particulate materials having particular compositions and shapes.

Description of the Related Art

High performance abrasive materials and components have long been used in various industrial-machining applications, including lapping/grinding, in which bulk material removal is executed, to fine polishing, in which fine micron and submicron surface irregularities are addressed. Typical materials that undergo such machining operations include various ceramics, glasses, glass-ceramics, metals and metal alloys. Abrasives may take on any one of various forms, such as free abrasives, which can include abrasive particulate material in a slurry. Alternatively, such abrasive particulate material may be incorporated into various matrix structures to form a fixed abrasive, such as a coated abrasive or a bonded abrasive. Coated abrasives are generally categorized as abrasive components having an underlying substrate, on which abrasive grits or grains are adhered thereto through a series of make coats and size coats. Bonded abrasives typically do not have an underlying substrate and are formed of an integral structure of abrasive grits that are bonded together via a matrix bonding material.

Particular portions of the industry are most interested in aluminous materials, typically alpha-alumina material for use in abrasive applications. Alpha alumina may be formed through conversion of an aluminous precursor, typically at a temperature on the order of 1000° C. to 1200° C. See, for example, Harato et al. (U.S. Pat. No. 5,302,368) and Kaisaki et al. (U.S. Pat. No. 6,194,317). Abrasive compounds containing primarily alpha alumina are useful in polishing metal surfaces at high material removal rates. Alpha alumina is the hardest phase of polycrystalline alumina and provides a desirably high material removal rate, however its use is limited to certain applications due to poor selectivity and tendencies to produce undesirable surface defects such as scratches and orange peel.

The industry continues to demand improved abrasive particulate materials that can be incorporated into various fixed abrasive articles.

SUMMARY

According to one aspect, a method of forming an abrasive article includes forming a porous alumina material and impregnating the porous alumina material with a primary additive composition to form an impregnated particulate material, the primary additive composition having a combination of Mg and Ca, wherein Mg and Ca are present in an additive ratio [Mg:Ca] within a range between 1:1 and about 10:1, and further comprising at least about 0.2 wt % Ca for the total weight of the abrasive particulate material.

According to another aspect, an abrasive article includes an abrasive particulate material having a shaped contour, wherein the abrasive particulate material has alumina crystals and a primary additive composition impregnated within the abrasive particulate material, the primary additive composition comprising a combination of Mg and Ca, wherein Mg and Ca are present in an additive ratio [Mg:Ca] within a range between 1:1 and about 10:1, and further comprising at least about 0.2 wt % Ca for the total weight of the abrasive particulate material.

In yet another aspect, an abrasive article includes a substrate and an abrasive particulate material comprising alumina crystals and a primary additive composition impregnated within the abrasive particulate material, the primary additive composition comprising a combination of Mg and Ca, wherein Mg and Ca are present in an additive ratio [Mg:Ca] within a range between 1:1 and about 10:1.

According to yet another aspect, an abrasive article includes an abrasive particulate material comprising alumina crystals and a primary additive composition comprising a first alkaline earth element and Ca, wherein Ca is present in an amount not greater than the first alkaline earth element, and wherein a majority of the primary additive composition is preferentially located at crystal boundaries of the alumina crystals.

In one aspect, an abrasive article includes an abrasive particulate material comprising alumina crystals and a primary additive composition, the primary additive composition comprising a first alkaline earth element and Ca, wherein the Ca is present in an amount not greater than an amount of the first alkaline earth element, and wherein the abrasive particulate material comprises between about 0.1 wt % and about 5 wt % of the primary additive composition for the total weight of the abrasive particulate material.

According another aspect, an abrasive article includes an abrasive particulate material having alumina crystals and a primary additive composition impregnated within the abrasive particulate material, the primary additive composition comprising a combination of Mg and Ca, wherein Mg and Ca are present in an additive ratio [Mg:Ca] within a range between about 1:1 and about 10:1, and further comprising at least about 0.2 wt % Ca for the total weight of the abrasive particulate material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
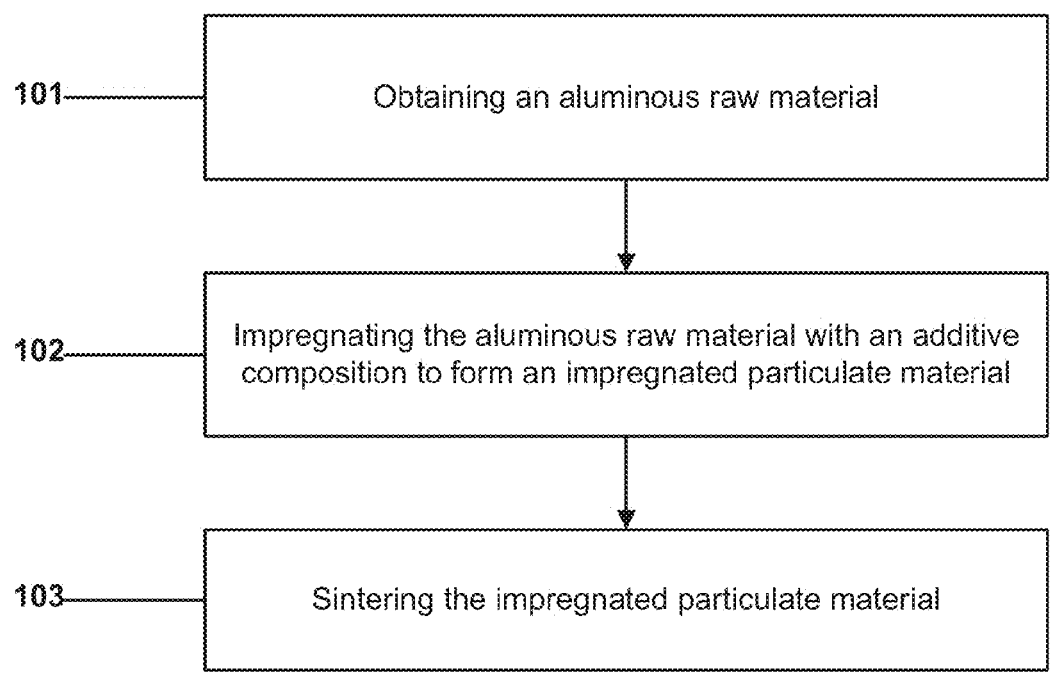
FIG. 1 is a flow chart illustrating a method of forming an abrasive particulate material according to an embodiment.

Synthesis of an abrasive particulate material according to an embodiment can be initiated by obtaining an aluminous raw material, as illustrated in step 101 of FIG. 1. While certain aluminous raw materials can be sourced commercially, in other instances, the aluminous raw material may be manufactured. For example, the aluminous raw material can be processed according to a seeded pathway. In one embodiment, the aluminous raw material can include a boehmite precursor and boehmite seeds in a suspension (alternatively sol or slurry), that can be heat-treated (such as by hydrothermal treatment) to convert the boehmite precursor into boehmite particulate material formed of particles or crystallites. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

After forming suitable boehmite particulate material, a heat treatment process can be carried out to effect polymorphic transformation, which removes water and forms an alumina material. According to one aspect, the boehmite particulate material can have a relatively elongated morphology, described generally herein in terms of primary (and also secondary and tertiary) aspect ratio and described in more detail below, and the morphology of the boehmite is largely preserved in the feedstock particulate material.

Primary aspect ratio is defined as the ratio of the longest dimension to the next longest dimension perpendicular to the longest dimension and is generally not less than 2:1, and preferably not less than 3:1, 4:1, or 6:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

Alternatively, the boehmite particulate material can have a platey or platelet-shaped contour, generally have an elongated structure having the primary aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1.

The morphology of the boehmite particulate material formed through a seeding process can have a relatively fine particle or crystallite size. Generally, the average boehmite material particle size is not greater than about 1000 nanometers, and fall within a range of about 100 to 1000 nanometers. Other embodiments have even finer average particle sizes, such as not greater than about 800 nanometers, 750 nanometers, 600 nanometers, 500 nanometers, 400 nanometers, and even particles having an average particle size smaller than 300 nanometers, representing a fine particulate material. As used herein, the "average particle size" in connection with high aspect ratio boehmite particulate material is used to denote the average longest or length dimension of the particles.

In addition to aspect ratio and average particle size of the boehmite particulate material, morphology of the boehmite particulate material may be further characterized in terms of specific surface area. Here, the commonly available BET technique was utilized to measure specific surface area of the boehmite particulate material. According to embodiments herein, the boehmite particulate material may have a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Turning to the details of the processes by which the seeded boehmite particulate material may be manufactured, generally ellipsoid, needle, or platelet-shaped boehmite are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material can have a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the individual particles formed through processing, rather than the aggregates which may remain in certain embodiments (e.g., for those products that call for an aggregated material).

Certain processing variables may be modified during the formation of the boehmite particulate material, to affect the desired morphology. These variables include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

After forming the boehmite particulate material, the process can further include heat-treatment of the boehmite particulate material to form an aluminous material. In accordance with a particular embodiment, the heat-treatment can include calcination of the boehmite particulate material at a temperature sufficient to cause transformation into a particular phase of alumina (e.g., gamma, delta, theta, alpha) or combination of phases of alumina providing a suitable aluminous material. For purposes of clarification, an aluminous material is one that comprises a majority content (wt %) of alumina ($Al_2O_3$) and preferably, at least about 80 wt %, at least 90 wt %, at least 95 wt % or even consisting essentially of alumina.

The calcining temperature can be dependent, in part, upon the type of boehmite particulate material and the desired phase of alumina. Generally, calcining can be conducted at a temperature of at least about 500° C., such as at least about 600° C., at least about 700° C., or even at least about 800° C. Still, according to certain embodiments, calcining can be conducted at a temperature not greater than about 1500° C., such as not greater than about 1200° C., or even not greater than about 1000° C. It will be appreciated that calcining can be conducted at a temperature within a range between any of the minimum and maximum temperatures noted above.

Calcination may be carried out in various environments including controlled gas and pressure environments. Because calcination is generally carried out to effect phase changes in the boehmite particulate material and not a chemical reaction, and since the resulting material is predominantly an oxide, specialized gaseous and pressure environments may not necessarily be implemented except for most compositionally and morphologically controlled alumina end products. According to one embodiment calcining can be conducted in an ambient atmosphere. Certain calcining operations may be conducted in a rotary kiln.

A suitable time for calcining depends in part upon the boehmite particulate material and the desired composition of the alumina. Typically, calcining is carried out for a duration of not greater than about 5 hours, generally within a range of about 10 minutes to 4 hours or 10 minutes to 3 hours. It will be appreciated that the processing guidelines described above are not restrictive and are merely illustrative of possible steps facilitating the formation of an aluminous material.

According to one embodiment the aluminous material formed as a result of calcination can be particularly porous. For example, the average pore volume of the aluminous material particles can be at least about 0.15 $cm^3/g$, such as at least about 0.2 $cm^3/g$, at least about 0.25 $cm^3/g$, at least about 0.27 $cm^3/g$, or even at least about 0.3 $cm^3/g$. Still, the average pore volume of the aluminous material in certain embodiments can be limited, such as not greater than about 0.5 $cm^3/g$ not greater than about 0.45 $cm^3/g$, or not greater than about 0.4 $cm^3/g$. The average pore volume of the aluminous material can be within a range between any of the minimum and maximum percentages noted above. The average pore volume can be measured via BET at a ramp rate of 10° C./min up to a soak temperature of 250° C. and a soak time of 60 minutes.

It will be appreciated that other intermediate processes can be taken before calcination of the boehmite particulate material. For example, the material may undergo optional processes to shape a slurry or sol containing the boehmite particulate material into individual shaped particles. The shapes of the particles can be maintained throughout further processing and described in more detail herein. Suitable shaping processes can include screen printing, molding, embossing, extruding, casting, pressing, cutting, and a combination thereof. Accordingly, after the shaping process, the calcination process can be completed to form shaped particles of aluminous raw material.

After obtaining the aluminous raw material at step 101, the process can continue at step 102 by impregnating the aluminous raw material with a primary additive composition. Notably, the impregnation process can be used to permeate certain elements, species, and/or compositions within the porous aluminous raw material. According to one embodiment, the impregnation process can include wherein impregnation comprises mixing a precursor salt material containing species of the primary additive composition with the porous alumina material, wherein mixing comprises wet mixing a solution comprising the precursor salt material with the porous alumina material.

In accordance with an embodiment the impregnation process can include mixing of a primary additive composition with porous alumina material. Notably, the mixing process can include a wet or dry mixing process. For example, the impregnation process can be a wet mixing process, wherein the primary additive composition can be prepared as a solution using a liquid carrier. Certain suitable liquid carrier materials can include an organic material, and inorganic materials, and a combination thereof. In one particular instance, the liquid carrier can be deionized water. Furthermore, the porous alumina material can optionally be prepared as a suspension using the same liquid carrier, including for example, deionized water.

In certain instances, the primary additive composition can include a precursor salt material. The precursor salt material can be a material that is provided within a solution facilitating a wet mixture and impregnation into the porous alumina material. In particular instances, preparation of the primary additive composition including a precursor salt material facilitates impregnation of certain species of the precursor salt material, including for example, metal cation elements into the porous alumina material. The porous alumina material can be further processed (e.g., dried) such that the particular species of the precursor salt material are contained within the porous alumina material, thus defining a primary additive composition within the abrasive particulate material in addition to the alumina crystals. In particular instances, the precursor salt material can include a nitrate, such as a metal nitrate composition. Other suitable salts can include chlorides, iodides, fluorides, sulfates, phosphates, oxalates, acetates, carbonates, and a combination thereof.

Generally, the primary additive composition can be present within the mixture in a minor amount. However, it will be appreciated that the amount of the primary additive composition impregnated into the porous alumina material may vary and can be calculated based on the desired final amount of additive composition within the finally-formed abrasive particulate material. In certain instances, the total amount of additive composition within the mixture during impregnation can be less than about 20 wt %, such as less than 15 wt %, less than 12 wt %, or even less than 10 wt % for the total weight of the mixture. Still, in particular instances, the amount of additive composition within the mixture can be at least about 0.11 wt %, such as at least about 0.5 wt %, or even at least about 1 wt % for the total weight of the mixture. It will be appreciated that the amount of additive composition within the mixture can be within a range between any of the minimum and maximum percentages noted above.

During impregnation the porous alumina material can be mixed with a solution containing the primary additive composition. After sufficient mixing the wet mixture may be allowed to dry facilitating removable of the liquid carrier and resulting in an impregnated particulate material made of the porous alumina material infiltrated with the primary additive composition, notably cation species of the precursor salt material. Drying may be conducted at temperatures greater than room temperature, including for example, temperature of at least about 50° C., at least about 70° C., or even at least about 85° C. Still, the drying temperature can be not greater than about 150° C., such as not greater than about 120° C. It will be appreciated that drying can be conducted at a temperature within a range between any of the minimum and maximum temperatures noted above.

The drying atmosphere may be generally an ambient atmosphere. Moreover, the duration for drying can be at least about 2 hours, at least about 4 hours, at least about 6 hours, or even at least about 10 hours.

After conducting the impregnation process at step 102, the process can continue at step 103 by sintering the impregnated particulate material. Sintering can be conducted to densify the impregnated particulate material, such as the material suitable for abrasive uses. In accordance with an embodiment the sintering process can be conducted at a sintering temperature that is greater than the calcining temperature utilized to form the porous aluminous material. In one particular instance, the sintering temperature can be at least about 800° C., at least about 900° C., such as least about 1000° C., at least about 1100° C., or even at least about 1200° C. Still, in accordance with one embodiment, the sintering temperature may be not greater than about 1600° C., such as not greater than about 1500° C., not greater than 1400° C., or even not greater than about 1350° C. It will be appreciated that the impregnated particulate material can be sintered at a sintering temperature within a range between any of the minimum and maximum temperature noted above.

Sintering may be conducted in a generally ambient atmosphere, and more particularly may be conducted in a rotary kiln, wherein the average residence time of the impregnated particulate material in the rotary kiln can define a sintering duration. Furthermore, the sintering duration at the sintering temperature can be at least about 2 minutes, such as at least about 5 minutes, or even at least about 8 minutes. In accordance with one particular embodiment, the sintering process may have a sintering duration of not greater than about 60 minutes, such as less than about 45 minutes.

Sintering of the impregnated particulate material can form an abrasive particulate material. According to one embodiment, the abrasive particulate material can have a specific surface area. For example, the abrasive particulate material can have a specific surface area that is not greater than about 0.15 m$^2$/g, such as not greater than about 0.13 m$^2$/g, not greater than about 0.1 m$^2$/g, or even not greater than about 0.09 m$^2$/g.

Moreover, the abrasive particulate material can be formed to have an average density of at least 3.7 g/cm$^3$. In other instances, the density of the abrasive particulate material can be greater, such as least about 3.75 g/cm$^3$, at least about 3.8 g/cm$^3$, or even at least about 3.85 g/cm$^3$. Still, the abrasive particulate material may have an average density that is not greater than about 4.00 g/cm$^3$, such as not greater than about 3.99 g/cm$^3$, or even not greater than 3.98 g/cm$^3$. It will be appreciated that the abrasive particulate material of the embodiments herein can have a density within a range between any of the minimum and maximum density values noted above.

In further reference to the abrasive particulate material, it will be appreciated that the crystalline content of such materials can be relatively high. Notably, processes of the embodiments herein can facilitate the formation of polycrystalline grit of abrasive particulate material having a crystalline content of at least 90 wt %, such as least about 92 wt %, at least about 95 wt %, at least about 97 wt %, at least about 99 wt % for the total weight of each of the grit. In particular instances, the abrasive particulate material can be formed such that essentially all of the total weight of the abrasive particulate material is crystalline content. That is, the abrasive particulate material may contain essentially no amorphous phase material.

Additionally, the abrasive particulate material can include alumina crystals that are made of alpha alumina. In particular instances, the alumina crystals can consists essentially of alpha alumina, excluding the content of any additive composition present within the alumina crystals.

Furthermore, the abrasive particulate material can include alumina crystals having an average crystal size of not greater than about 1 micron. Reference herein to crystal size may be the same as reference to a grain size, or the average size of the smallest single crystal structure within a grit of the abrasive particulate material. In other instances, the average crystal size of the alumina crystals can be less, such as not greater than about 800 nanometers, not greater than about 500 nanometers, such as not greater than about 300 nanometers or even not greater than about 200 nanometers. In fact, certain alumina particulate material can be manufactured to have an average alumina crystal size not greater than about 175 nanometers, not greater than about 160 nanometers or even not greater than about 150 nanometers. Still, in at least one embodiment, the abrasive particulate material can be formed such as the alumina crystals have an average crystal size of at least about 0.1 nanometers, such as at least about 1 nanometer, at least about 5 nanometers, at least about 10 nanometers, at least about 20 nanometers, at least about 30 nanometers, at least about 40 nanometers, at least about 50 nanometers, or even at least about 80 nanometers. It will be appreciated that the abrasive particulate material can be made of alumina crystals having an average crystal size within a range between any of the minimum and maximum values noted above.

The abrasive particulate material can be formed to have a certain average particle size, which may depend upon certain processing parameters. For example, in certain instances, the abrasive particulate material can be formed to have a shaped contour or complex shape, which will be described in more detail herein. In such cases, the abrasive particulate material can have an average particle size of not greater than about 3 millimeters, not greater than about 2.8 millimeters, not greater than about 2.5 millimeters, not greater than about 2 millimeters, but may be at least about 0.1 mm, at least about 0.3 mm, or even at least about 0.4 mm. It will be appreciated that reference to average particle size is a measure of a single dimension of the particle having the greatest value. It will be appreciated that the abrasive particulate material can having an average particle size within a range between any of the minimum and maximum values noted above.

In certain other instances, the abrasive particulate material can be manufactured to have a finer grit size, including for example, an average particle size of not greater than about 1.5 millimeters, not greater than about 1 millimeter, not greater than about 500 microns, not greater than about 300 microns, not greater than about 100 microns, not greater than about 50 microns, not greater than about 10 microns, not greater than about 1 micron, not greater than about 0.8 microns, or even not greater than about 0.6 microns. Still, the abrasive particulate material may be formed such that the average particle size is at least about 50 nanometers, at least about 80 nanometers, at least about 100 nanometers, or even at least about 150 nanometers. It will be appreciated that the abrasive particulate material can having an average particle size within a range between any of the minimum and maximum values noted above.

The abrasive particulate material can be formed such that it has a particular composition. For example, the abrasive particulate material may be formed such that it is essentially free of alkali metal elements, including for example, cations having one plus (1+) valence states, and more particularly, elements on the Periodic Table belonging to Group 1 (See, IUPAC Period Table of Elements 2010). In particular, the abrasive particulate material can be essentially free of alkali metal elements including lithium (Li), sodium (Na), potassium (K), rubidium (Rb), cesium (Ce), and francium (Fr). In a particular instance, the abrasive particulate material can be essentially free of sodium, such that the content of sodium within the abrasive particulate material is not greater than an impurity amount, including for example not greater than about 0.01 wt % for the total weight of the abrasive particulate material.

According to one embodiment, the abrasive particulate material can be impregnated with specific materials, and more particularly, with specific species provided within the primary additive composition during impregnation. In accordance with an embodiment, the primary additive composition can include a combination of specific alkaline earth elements, wherein the alkaline earth elements were introduced in the precursor salt material and impregnated the porous alumina material. Suitable alkaline earth elements include elements selected from Group 2 of the Period Table of Elements (See, IUPAC Periodic Table of Elements, 2010), and more particularly, elements beryllium (Be), magnesium (Mg), calcium (Ca), strontium (Sr), barium (Ba), and a combination thereof. Certain abrasive particulate materials can be formed to have a particular combination of alkaline earth elements, including for example, magnesium and calcium.

In an embodiment, the abrasive particulate material can be formed to have a particular additive ratio of magnesium and calcium (Mg:Ca) defining a ratio between the weight percent of magnesium to the weight percent of calcium within the abrasive particulate material. For example, the additive ratio can be within a range between about 1:1 and about 10:1. In other embodiments, the additive ratio can be within a range between about 1:1 and about 9:1, such as within a range between about 1:1 and 8:1, or even within a range between about 1:1 and about 7:1, within a range between about 2:1 and about 7:1, within a range between about 2:1 and about 6:1, within a range between about 2:1 and about 5:1, within a range between about 1:1 and about 4:1, or even within a range between about 2:1 and about 4:1, and still within a range between about 1:1 and about 3:1, or even within a range between about 2:1 and about 3:1.

In particular instances, the abrasive particulate material can be formed to have a certain content of calcium (Ca). For example, abrasive particulate can include not greater than about 2.0 wt % calcium, such as not greater than about 1.8 wt % calcium, not greater than about 1.6 wt % calcium, not greater than about 1.4 wt % calcium, not greater than about 1.2 wt % calcium, not greater than about 1.0 wt % calcium, not greater than about 0.9 wt %, not greater than about 0.8 wt %, not greater than about 0.6 wt % for the total weight of the abrasive particulate material. Still, the amount of calcium within the abrasive particulate material can be at least about 0.2 wt %, or even at least about 0.25 wt %, at least about 0.27 wt %, at least about 0.29 wt %, or even at least about 0.3 wt % for the total weight of the abrasive particulate material. It will be appreciated that the amount of calcium within the abrasive particulate material can be within a range between any of the minimum and maximum weight percentages noted above. 1.0 wt % Ca, Ca for the total weight of the abrasive particulate material.

In yet another embodiment, the abrasive particulate material can be formed to contain a specific amount of magnesium (Mg). For example, the amount of magnesium within the abrasive particulate material can be greater than the content of calcium. According to one embodiment, the amount of magnesium can be not greater than about 5.0 wt %, such as not greater than about 4.5 wt %, not greater than about 4.0 wt %, not greater than about 3.5 wt %, not greater than about 3.0 wt %, not greater than about 2.0 wt %, not greater than about 1.8 wt %, not greater than about 1.5 wt %, not greater than about 1.2 wt %, or even not greater than about 1.0 wt % for the total weight of the abrasive particulate material. Yet, in particular instances, the abrasive particulate material may be formed such that it contains a minimum amount of magnesium, including for example at least about 0.1 wt %, at least about 0.2 wt %, at least about 0.3 wt %, at least about 0.4 wt %, at least about 0.5 wt %, at least about 0.6 wt %, at least about 0.7 wt %, or even at least about 0.8 wt % magnesium for the total weight of the abrasive particulate material. It will be appreciated that the amount of magnesium within the abrasive particulate material can be within a range between any of the minimum and maximum weight percentages noted above.

In accordance with another embodiment, the abrasive particulate material can contain a certain total amount of the primary additive composition. For example, the abrasive particulate material can be formed such that it contains not greater than about 8.0 wt % of the total additive composition for the total weight of the abrasive particulate material. In other instances, the abrasive particulate material can be formed such that it contains not greater than about 7.0 wt %, not greater than about 6.0 wt %, not greater than about 5.0 wt %, such as not greater than about 4.0 wt %, not greater than about 3.0 wt %, or even not greater than about 2.0 wt % total additive composition for the total weight of the abrasive particulate material. Still, the abrasive particulate material may contain a minimum amount of the primary additive composition. For example, the abrasive particulate material can contain at least about 0.4 wt %, such as at least about 0.5 wt %, at least about 0.7 wt %, at least about 0.9 wt %, at least about 1.0 wt %, or even at least about 1.2 wt % primary additive composition for the total weight of the abrasive particulate material. It will be appreciated that the abrasive particulate material can contain a total amount of the primary additive composition within a range between any of the minimum and maximum percentages noted above.

With respect to certain abrasive particulate materials of the embodiments herein utilizing a primary additive composition, and more particularly, certain abrasive particulate materials including a primary additive composition including Mg and Ca, a secondary additive composition can be impregnated within such abrasive particulate material. The presence of certain secondary additives may facilitate improved mechanical and/or chemical characteristics of the abrasive particulate material. In certain instances, the abrasive particulate material can include a secondary additive composition including a rare earth oxide material. In other instances, the secondary additive composition can include specific alkaline earth oxide materials in addition to the MgO of the primary additive composition. Alternatively, or in addition to other materials, the secondary additive composition can include a transition metal oxide material. Some suitable oxide materials of the secondary additive composition can include $Y_2O_3$, $La_2O_3$, BaO, $Cr_2O_3$, CoO, $Fe_2O_3$, $GeO_2$, $HfO_2$, MnO, NiO, $Sc_2O_3$, SrO, $TiO_2$, ZnO, $ZrO_2$, and a combination thereof.

The abrasive particulate material of the embodiments herein can include a particular content of the secondary additive composition. In particular instances, the abrasive particulate material may contain a content of secondary additive composition that is less than the amount of the first additive composition. Alternatively, the secondary additive composition may be present in an amount greater than an amount of the primary additive composition. For example, the abrasive particulate material can include not greater than about 5 wt %, such as not greater than about 4.5 wt %, not greater than about 4 wt %, not greater than about 3.5 wt %, not greater than about 3 wt %, not greater than about 2.0 wt %, not greater than about 1.8 wt %, not greater than about 1.5 wt %, or even not greater than about 1.2 wt % of the secondary additive composition for the total weight of the abrasive particulate material. Still, the amount of the secondary additive composition can be at least about 0.1 wt %, such as at least about 0.2 wt %, at least about 0.3 wt %, at least about 0.4 wt %, at least about 0.5 wt %, at least about 0.6 wt %, or even at least about 0.7 wt % for the total weight of the abrasive particulate material.

In accordance with an embodiment, the material species of the primary additive composition can be disposed in particular locations within the abrasive particulate material. For example, it has been discovered that an impregnation process may likely uniformly distribute particular elemental species within the abrasive particulate material better than other methods of forming, including for example doping processes. Reference to doping processes can include those processes wherein additives are provided early in the process, oftentimes in an initial mixture of alumina precursor material, such as boehmite. Such doping processes result in non-uniform dispersion of the additives within the finally-formed alumina particles due to preferential segregation of the additive during further processing such as drying, calcining and the like.

By contrast, impregnation introduces the primary additive composition at a later stage, notably after formation of a porous alumina material. Without wishing to be tied to a particular theory, it is thought that the impregnation process, unlike the doping process, can introduce particular elemental species of the primary additive composition into fine, intergranular pores within the microstructure of the porous alumina material. The species of the primary additive composition can be held securely within the microstructure and avoid segregated during further processing, which may be limited to a sintering process. As such, utilization of an impregnation process can facilitate more homogeneous and more uniformly dispersed species of the primary additive composition throughout the abrasive particulate material as compared to doping.

Figures 2A, 2B, 3:
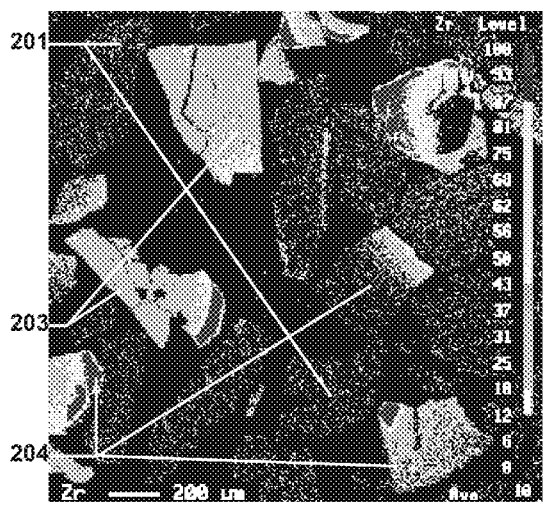
FIGS. 2A and 2B include pictures of abrasive particulate material, wherein FIG. 2A includes a picture of abrasive particulate material formed through a doping process, and FIG. 2B includes a picture of abrasive particulate material formed through an impregnation process according to an embodiment.
FIG. 3 includes an illustration of the microstructure of an abrasive particulate material according to an embodiment.

As evidence of the aforementioned phenomenon, FIG. 2A includes a picture of an abrasive particulate material formed through a doping process and FIG. 2B includes a picture of an abrasive particulate material formed through an impregnation process according to an embodiment. As illustrated in FIG. 2A, includes a microprobe image of abrasive particles formed through a doping process, wherein the microprobe is set to detect zirconium. As clearly shown in FIG. 2A, the concentration of zirconium, as evidenced by the varying colors within the abrasive particles is non-uniformly dispersed. FIG. 2 was generated using an Electronic Probe Micro Analyzer JEOL JX8800R following the specific program of elementary mapping in the equipment. As illustrated, the abrasive particulate material includes certain abrasive particles 201 demonstrating zero to little zirconium content. By contrast, the abrasive particles 203 show a significant content of zirconium, indicating the entire surface of the particles may contain zirconium. Moreover, abrasive particles 204 demonstrate non-uniform dispersion of the zirconium within the abrasive particles, wherein edges of the particles exhibit greater concentrations of zirconium than portions at the interior of the particles. As such, the abrasive particulate material of FIG. 2A formed through a doping process, demonstrates the significant segregation of certain elemental species (e.g., Zr) within the abrasive particles and between the abrasive particles.

FIG. 2B includes a picture of an abrasive particulate material including abrasive particles having an additive formed through an impregnation process. The picture of FIG. 2B is the result of a microprobe analysis, with the microprobe set to detect zirconium under the same preparation and conditions as used in the creation and analysis of FIG. 2A. As illustrated, the abrasive particles 205 of the abrasive particulate material illustrated in FIG. 2B demonstrates uniform and homogeneous dispersion of zirconium throughout the abrasive particles 205 and even between the abrasive particles. Each of the particles 205 of FIG. 2B demonstrate uniform "speckling" throughout the volume of the particles as evidence of uniform distribution of the impregnated additive zirconium, with little to no congregation of zirconium at the edges of the particles, or significantly greater concentrations of zirconium in one particle than another particle.

In accordance with an embodiment, the abrasive particulate material of the embodiments herein can consist essentially of alumina crystals and the primary additive composition. Notably, the primary additive composition can include a content of magnesium and calcium, and may consist essentially of magnesium and calcium. More particularly, the magnesium content within the abrasive particulate material can be substantially uniformly dispersed throughout the abrasive particulate material. That is, the content of magnesium within the abrasive particulate material can be uniformly dispersed throughout the polycrystalline structure such that it is as likely to be identified within the crystal grains of alumina as it is at the crystal boundaries between the alumina crystals.

In accordance with another embodiment, the microstructure of the abrasive particulate material can be such that a majority of the primary additive composition including all elemental species (e.g. magnesium and calcium) can be preferentially located at the crystal boundaries between the alumina crystals. For example, in considering the total content of elemental species within the primary additive composition, it is more likely that such elemental species are located at the crystal boundaries between the alumina crystals than within the alumina crystal. Notably, in certain embodiments, the primary additive composition can include calcium, which may be preferentially located at the crystal boundaries between the alumina crystals. That is, for example the calcium can be more likely to be found at crystal boundaries than within the alumina crystals.

FIG. 3 includes an illustration of microstructure in accordance with an embodiment. As illustrated, the abrasive particulate material 300 can have a polycrystalline structure defined by a plurality of alumina crystals 301 separated from each other at crystal boundaries 302, 303, and 304. As further illustrated, the abrasive particle 300 can include the primary additive composition 307, which may be present in the form of a distinct crystalline phase apart from the alumina crystals 301 or as components contained within another phase, such as in solid solution with alumina crystals. In particular instances, as illustrated, the crystals containing species of the primary additive composition (e.g. Ca and Mg) can be located within the alumina crystals 301 and at the crystal boundaries 302, 303, and 304. In particular instances, the total content of the primary additive composition can be preferentially located at the crystal boundaries 302, 303, and 304 such that there is a greater content of the primary additive composition at the crystal boundaries 302, 303, 304 than within the alumina crystals 301.

In yet another aspect, the abrasive particulate material can be formed to have a specific shape or contour. Suitable forming techniques can include extrusion, molding, screen printing, casting, punching, embossing, pressing, cutting, and a combination thereof. For example, the abrasive particulate material can have a specific contour, such as a polyhedral shape, including for example, triangular, rectangular, pentagonal, hexagonal, conical, helical, elliptical, and elongated shapes. The abrasive particulate material may include a combination of such shapes. In one particular embodiment, the abrasive particulate material can be formed of a body having a complex three-dimensional geometry including 3-fold symmetry in three perpendicular planes defined by a longitudinal axis, a lateral axis, and a vertical axis.

Figure 4:
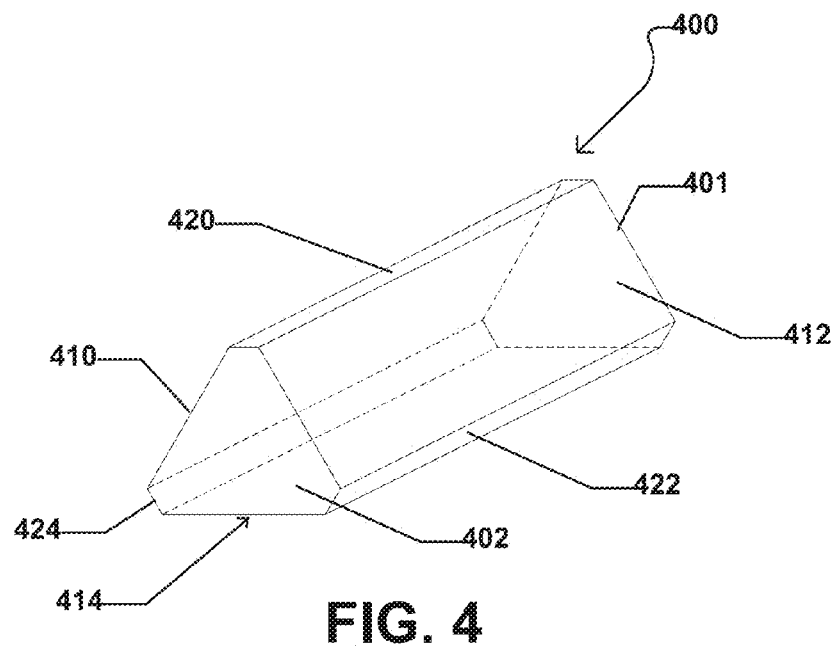
FIGS. 4-9 include illustrations of shaped abrasive particles including the abrasive particulate material according to an embodiment.

FIGS. 4-9 include exemplary abrasive particulate material having specific contours and defining shaped abrasive particles, which can incorporate the compositions described herein. As shown in FIG. 4, the shaped abrasive particle 400 may include a body 401 that is generally prismatic with a first end face 402 and a second end face 404. Further, the shaped abrasive particle 400 may include a first side face 410 extending between the first end face 402 and the second end face 404. A second side face 412 may extend between the first end face 402 and the second end face 404 adjacent to the first side face 410. As shown, the shaped abrasive particle 400 may also include a third side face 414 extending between the first end face 402 and the second end face 404 adjacent to the second side face 412 and the first side face 410.

As depicted in FIG. 4, the shaped abrasive particle 400 may also include a first edge 420 between the first side face 410 and the second side face 412. The shaped abrasive particle 400 may also include a second edge 422 between the second side face 412 and the third side face 414. Further, the shaped abrasive particle 400 may include a third edge 424 between the third side face 414 and the first side face 412.

As shown, each end face 402, 404 of the shaped abrasive particle 400 may be generally triangular in shape. Each side face 410, 412, 414 may be generally rectangular in shape. Further, the cross section of the shaped abrasive particle 400 in a plane parallel to the end faces 402, 404 can be generally triangular. It will be appreciated that while the cross-sectional shape of the shaped abrasive particle 400 through a plane parallel to the end faces 402, 404 is illustrated as being generally triangular, other shapes are possible, including any polygonal shapes, for example a quadrilateral, a pentagon, a hexagon, a heptagon, an octagon, a nonagon, a decagon, etc. Further, the cross-sectional shape of the shaped abrasive particle may be convex, non-convex, concave, or non-concave.

Figure 5:
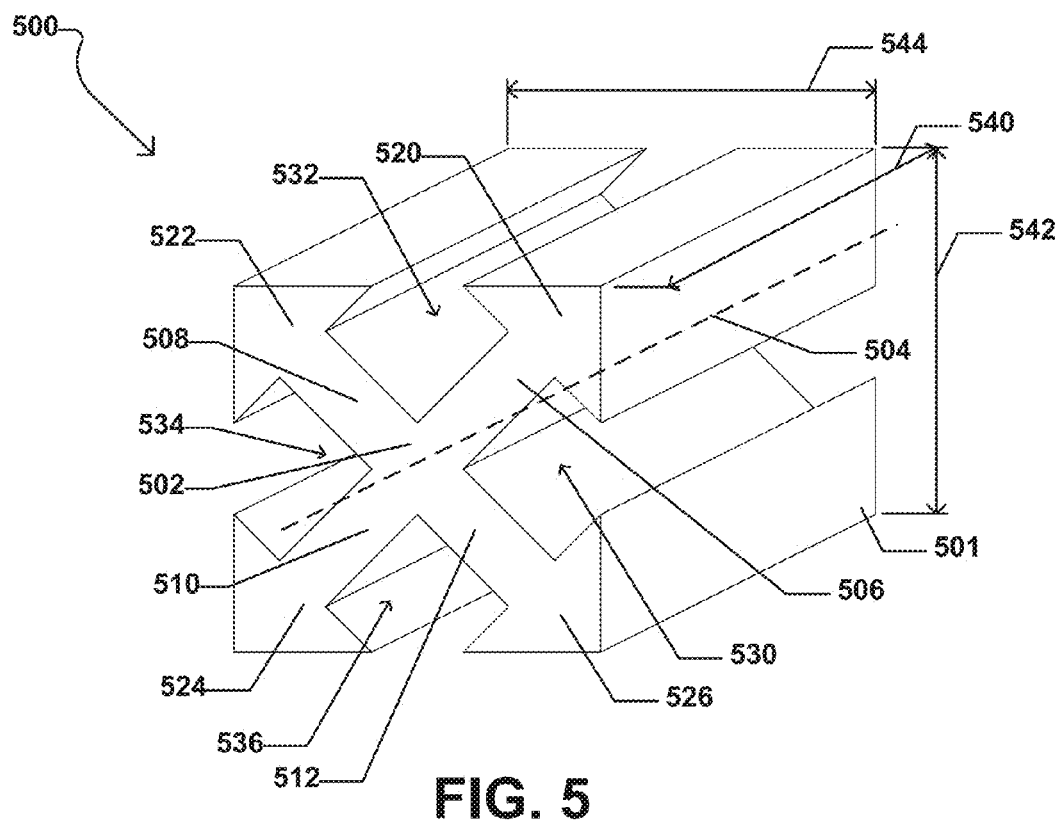

FIG. 5 includes an illustration of a shaped abrasive particle according to another embodiment. As depicted, the shaped abrasive particle 500 may include a body 501 that may include a central portion 502 that extends along a longitudinal axis 504. A first radial arm 506 may extend outwardly from the central portion 502 along the length of the central portion 502. A second radial arm 508 may extend outwardly from the central portion 502 along the length of the central portion 502. A third radial arm 510 may extend outwardly from the central portion 502 along the length of the central portion 502. Moreover, a fourth radial arm 512 may extend outwardly from the central portion 502 along the length of the central portion 502. The radial arms 506, 508, 510, 512 may be equally spaced around the central portion 502 of the shaped abrasive particle 500.

As shown in FIG. 5, the first radial arm 506 may include a generally arrow shaped distal end 520. The second radial arm 508 may include a generally arrow shaped distal end 522. The third radial arm 510 may include a generally arrow shaped distal end 524. Further, the fourth radial arm 512 may include a generally arrow shaped distal end 526.

FIG. 5 also indicates that the shaped abrasive particle 500 may be formed with a first void 530 between the first radial arm 506 and the second radial arm 508. A second void 532 may be formed between the second radial arm 508 and the third radial arm 510. A third void 534 may also be formed between the third radial arm 510 and the fourth radial arm 512. Additionally, a fourth void 536 may be formed between the fourth radial arm 512 and the first radial arm 506.

As shown in FIG. 5, the shaped abrasive particle 500 may include a length 540, a height 542, and a width 544. In a particular aspect, the length 540 is greater than the height 542 and the height 542 is greater than the width 544. In a particular aspect, the shaped abrasive particle 500 may define a primary aspect ratio that is the ratio of the length 540 to the height 542 (length:width). Further, the shaped abrasive particle 500 may define a secondary aspect ratio that is the ratio of the height 542 to the width 544 (width:height). Finally, the shaped abrasive particle 500 may define a tertiary aspect ratio that is the ratio of the length 540 to the width 542 (length:height).

According to one embodiment, the shaped abrasive particles can have a primary aspect ratio of at least about 1:1, such as at least about 1.1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

In another instance, the shaped abrasive particle can be formed such that the body has a secondary aspect ratio of at least about 0.5:1, such as at least about 0.8:1, at least about 1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Furthermore, certain shaped abrasive particles can have a tertiary aspect ratio of at least about 1:1, such as at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Certain embodiments of the shaped abrasive particle 500 can have a shape with respect to the primary aspect ratio that is generally rectangular, e.g., flat or curved. The shape of the shaped abrasive particle 500 with respect to the secondary aspect ratio may be any polyhedral shape, e.g., a triangle, a square, a rectangle, a pentagon, etc. The shape of the shaped abrasive particle 500 with respect to the secondary aspect ratio may also be the shape of any alphanumeric character, e.g., 1, 2, 3, etc., A, B, C. etc. Further, the contour of the shaped abrasive particle 500 with respect to the secondary aspect ratio may be a character selected from the Greek alphabet, the modern Latin alphabet, the ancient Latin alphabet, the Russian alphabet, any other alphabet, or any combination thereof. Further, the shape of the shaped abrasive particle 500 with respect to the secondary aspect ratio may be a Kanji character.

Figure 6:
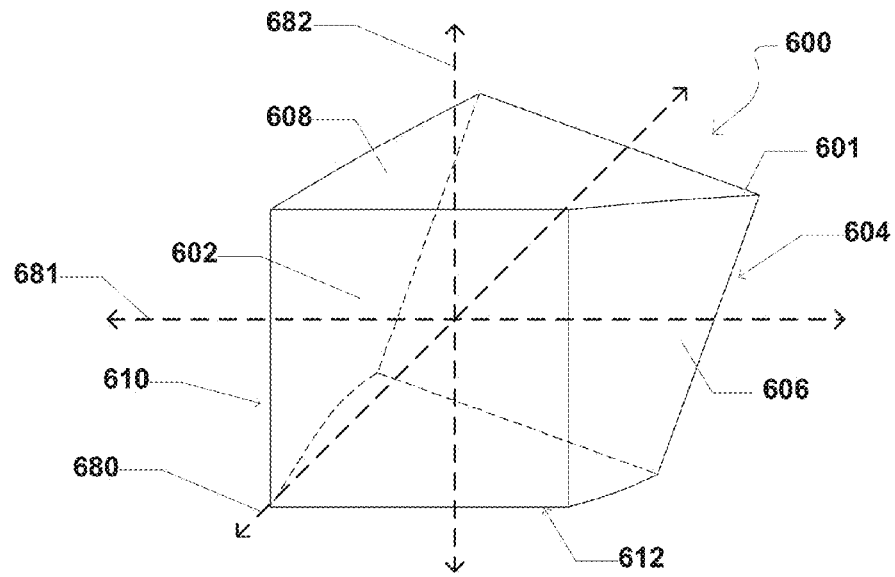
Figure 7:
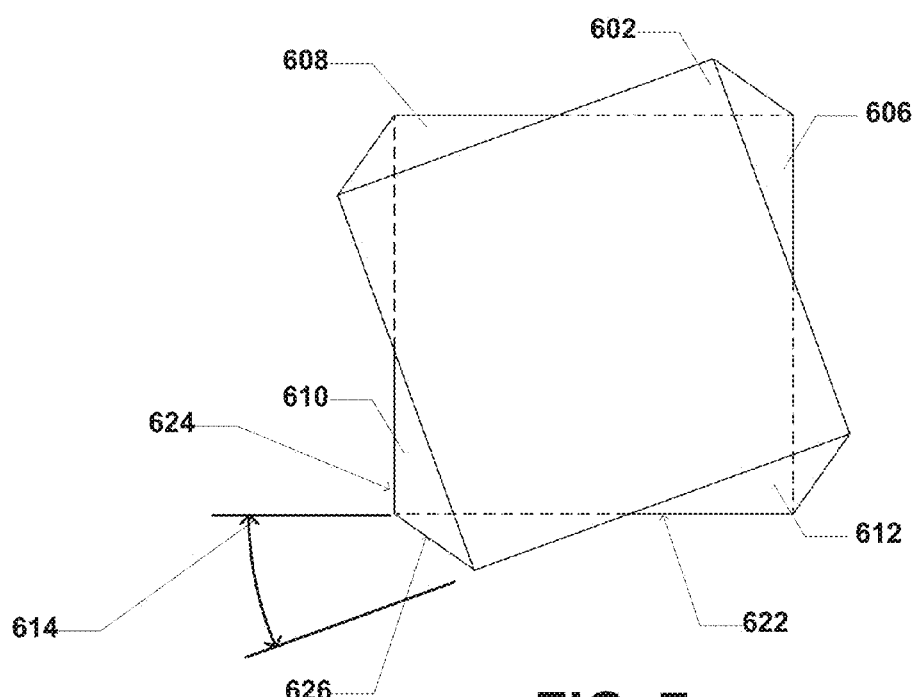

FIGS. 6-7 depict another embodiment of a shaped abrasive particle that is generally designated 600. As shown, the shaped abrasive particle 600 may include a body 601 that has a generally cube-like shape. It will be appreciated that the shaped abrasive particle may be formed to have other polyhedral shapes. The body 601 may have a first end face 602 and a second end face 604, a first lateral face 606 extending between the first end face 602 and the second end face 604, a second lateral face 608 extending between the first end face 602 and the second end face 604. Further, the body 601 can have a third lateral face 610 extending between the first end face 602 and the second end face 604, and a fourth lateral face 612 extending between the first end face 602 and the second end face 604.

As shown, the first end face 602 and the second end face 604 can be parallel to each other and separated by the lateral faces 606, 608, 610, and 612, giving the body a cube-like structure. However, in a particular aspect, the first end face 602 can be rotated with respect to the second end face 604 to establish a twist angle 614. The twist of the body 601 can be along one or more axes and define particular types of twist angles. For example, as illustrated in a top-down view of the body in FIG. 7 looking down the longitudinal axis 680 defining a length of the body 601 on the end face 602 parallel to a plane defined by the lateral axis 681 extending along a dimension of width of the body 601 and the vertical axis 682 extending along a dimension of height of the body 601. According to one embodiment, the body 601 can have a longitudinal twist angle 614 defining a twist in the body 601 about the longitudinal axis such that the end faces 602 and 604 are rotated relative to each other. The twist angle 614, as illustrated in FIG. 7 can be measured as the angle between a tangent of a first edge 622 and a second edge 624, wherein the first edge 622 and second edge 624 are joined by and share a common edge 626 extending longitudinally between two of the lateral faces (610 and 612). It will be appreciated that other shaped abrasive particles can be formed to have twist angles relative to the lateral axis, the vertical axis, and a combination thereof. Any of such twist angles can have a value as described herein.

In a particular aspect, the twist angle 614 is at least about 1°. In other instances, the twist angle can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 614 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Further, the body may include an opening that extends through the entire interior of the body along one of the longitudinal axis, lateral axis, or vertical axis.

Figure 8:
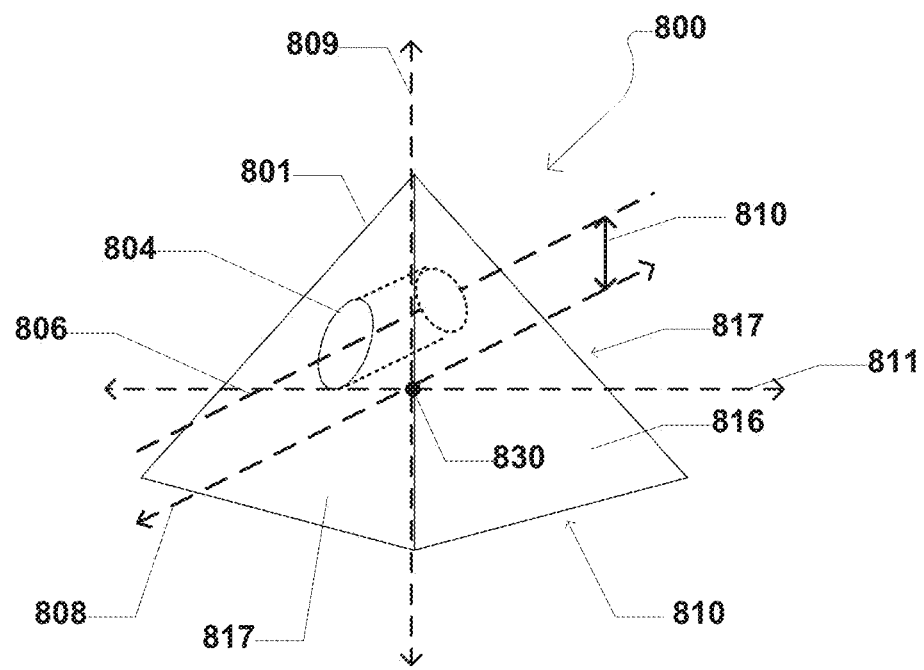

FIG. 8 includes an illustration of another embodiment of a shaped abrasive particle. As shown, the shaped abrasive particle 800 may include a body 801 having a generally pyramid shaped with a generally triangle shaped bottom face 802. The body can further include sides 816, 817, and 818 connected to each other and the bottom face 802. It will be appreciated that while the body 801 is illustrated as having a pyramidal polyhedral shape, other shapes are possible, as described herein/

According to one embodiment, the shaped abrasive particle 800 may be formed with a hole 804 (i.e., and opening) that can extend through at least a portion of the body 801, and more particularly may extend through an entire volume of the body 801. In a particular aspect, the hole 804 may define a central axis 806 that passes through a center of the hole 804. Further, the shaped abrasive particle 800 may also define a central axis 808 that passes through a center 830 of the shaped abrasive particle 800. It may be appreciated that the hole 804 may be formed in the shaped abrasive particle 800 such that the central axis 806 of the hole 804 is spaced apart from the central axis 808 by a distance 810. As such, a center of mass of the shaped abrasive particle 800 may be moved below the geometric midpoint 830 of the shaped abrasive particle 800, wherein the geometric midpoint 830 can be defined by the intersection of a longitudinal axis 809, vertical axis 811, and the central axis (i.e., lateral axis) 808. Moving the center of mass below the geometric midpoint 830 of the shaped abrasive grain can increase the likelihood that the shaped abrasive particle 800 lands on the same face, e.g., the bottom face 802, when dropped, or otherwise deposited, onto a backing, such that the shaped abrasive particle 800 has a predetermined, upright orientation.

In a particular embodiment, the center of mass is displaced from the geometric midpoint 830 by a distance that can be at least about 0.05 the height (h) along a vertical axis 810 of the body 802 defining a height. In another embodiment, the center of mass may be displaced from the geometric midpoint 830 by a distance of at least about 0.1 (h), such as at least about 0.15 (h), at least about 0.18 (h), at least about 0.2 (h), at least about 0.22 (h), at least about 0.25 (h), at least about 0.27 (h), at least about 0.3 (h), at least about 0.32 (h), at least about 0.35 (h), or even at least about 0.38

(h). Still, the center of mass of the body 801 may be displaced a distance from the geometric midpoint 830 of no greater than 0.5 (h), such as no greater than 0.49 (h), no greater than 0.48 (h), no greater than 0.45 (h), no greater than 0.43 (h), no greater than 0.40 (h), no greater than 0.39 (h), or even no greater than 0.38 (h). It will be appreciated that the displacement between the center of mass and the geometric midpoint can be within a range between any of the minimum and maximum values noted above.

In particular instances, the center of mass may be displaced from the geometric midpoint 830 such that the center of mass is closer to a base, e.g., the bottom face 802, of the body 801, than a top of the body 801 when the shaped abrasive particle 800 is in an upright orientation as shown in FIG. 8.

In another embodiment, the center of mass may be displaced from the geometric midpoint 830 by a distance that is at least about 0.05 the width (w) along a lateral axis 808 of the of the body 801 defining the width. In another aspect, the center of mass may be displaced from the geometric midpoint 830 by a distance of at least about 0.1 (w), such as at least about 0.15 (w), at least about 0.18 (w), at least about 0.2 (w), at least about 0.22 (w), at least about 0.25 (w), at least about 0.27 (w), at least about 0.3 (w), or even at least about 0.35 (w). Still, in one embodiment, the center of mass may be displaced a distance from the geometric midpoint 830 no greater than 0.5 (w), such as no greater than 0.49 (w), no greater than 0.45 (w), no greater than 0.43 (w), no greater than 0.40 (w), or even no greater than 0.38 (w).

In another embodiment, the center of mass may be displaced from the geometric midpoint 830 along the longitudinal axis 809 by a distance ($D_l$) of at least about 0.05 the length (l) of the body 801. According to a particular embodiment, the center of mass may be displaced from the geometric midpoint by a distance of at least about 0.1 (l), such as at least about 0.15 (l), at least about 0.18 (l), at least about 0.2 (l), at least about 0.25 (l), at least about 0.3 (l), at least about 0.35 (l), or even at least about 0.38 (l). Still, for certain abrasive particles, the center of mass can be displaced a distance no greater than about 0.5 (l), such as no greater than about 0.45 (l), or even no greater than about 0.40 (l).

Figure 9:
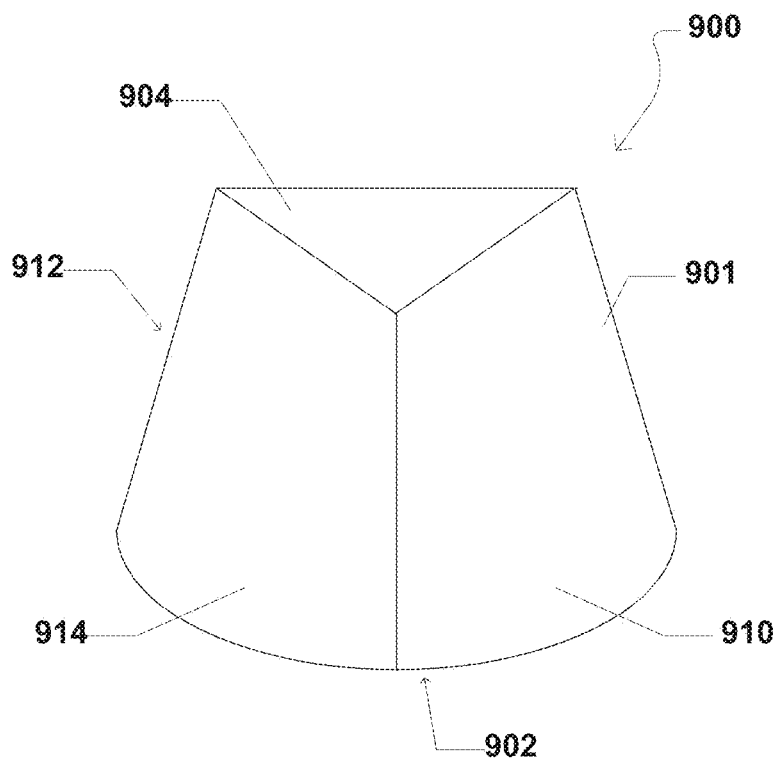

FIG. 9 includes an illustration of a shaped abrasive particle according to an embodiment. The shaped abrasive grain 900 may include a body 901 including a base surface 902 and an upper surface 904 separated from each other by one or more side surfaces 910, 912, and 914. According to one particular embodiment, the body 901 can be formed such that the base surface 902 has a planar shape different than a planar shape of the upper surface 904, wherein the planar shape is viewed in the plane defined by the respective surface. For example, as illustrated in the embodiment of FIG. 9, the body 901 can have base surface 902 generally have a circular shape and an upper surface 904 having a generally triangular shape. It will be appreciated that other variations are feasible, including any combination of shapes at the base surface 902 and upper surface 904.

Figure 10:
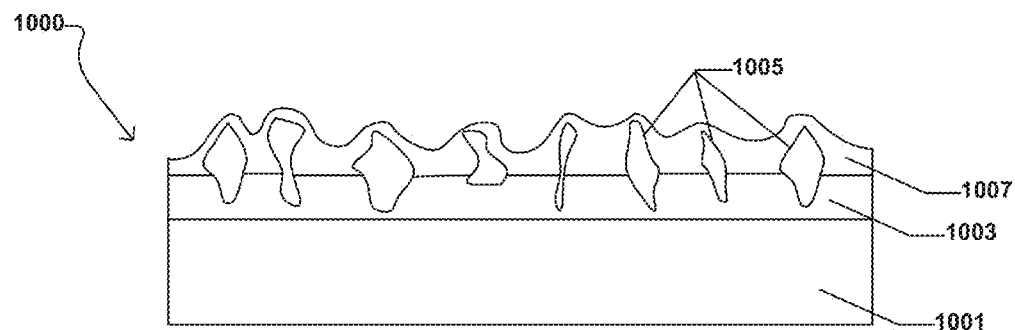
FIG. 10 includes an illustration of a coated abrasive article incorporating the abrasive particulate material according to an embodiment.

FIG. 10 includes a cross-sectional illustration of a coated abrasive article incorporating the abrasive particulate material in accordance with an embodiment. As illustrated, the coated abrasive 1000 can include a substrate 1001, a make coat 1003 overlying a surface of the substrate 1001, abrasive particulate material 1005 in accordance with any of the embodiments herein overlying and bonded to the make coat 1003, and a size coat 105 overlying and bonded to the abrasive particulate material 1005.

According to one embodiment, the substrate 1001 can include an organic material, inorganic material, and a combination thereof. In certain instances, the substrate 1001 can include a woven material. However, the substrate 1001 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1003 can be applied to the surface of the substrate 1001 in a single process, or alternatively, the abrasive particulate material 1005 can be combined with a make coat 1003 material and applied as a mixture to the surface of the substrate 1001. Suitable materials of the make coat 1003 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1003 can include a polyester resin. The coated substrate can then be heated in order to cure the resin and the abrasive particulate material to the substrate. In general, the coated substrate is heated to a temperature of between about 100° C. to less than about 250° C. during this curing process.

After sufficiently forming the make coat 1003 with the abrasive particulate material 1005 contained therein, the size coat 1007 can be formed to overlie and bond the abrasive particulate material 1005 in place. The size coat can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

EXAMPLE 1

A raw material boehmite commercially available as Catapal B from Sasol Corp. is incorporated into a mixture including 42% solids (boehmite), 1 wt % seed material (alpha alumina) for the total weight of the boehmite, and 2.5 wt % nitric acid for the total weight of the boehmite. The mixture can be in the form of a slurry using water as the liquid carrier. The slurry gels under ambient conditions.

After gelling, the slurry is screen printed to form shaped particles comprising the boehmite material. The screen printing process is generally described in U.S. Pat. No. 6,054,093. In the screen printing process, a printing screen in the form of a continuous belt passes around a series of four rollers defining particular zones, including an application zone, a disengagement zone, a cleaning zone, and a treatment zone. In the application zone, the printing screen is held in firm contact with a continuous stainless steel belt and a paste of abrasive precursor particles is applied to the inside surface of the printing screen. The paste is forced into apertures in the printing screen while the printing screen is in direct contact with the belt. In the disengagement zone as the printing screen is disengaged from the belt, discrete shapes of the paste remain on the surface of the belt, wherein the discrete shapes have the contour of the apertures in the printing screen. The shapes are transported by the belt to a drying zone, where the shapes are dried at 90-95° C. in an ambient atmosphere for approximately 5-10 minutes depending on the speed of the belt.

After shaping, the dried, shaped particles are calcined in a rotary furnace at approximately 900° C., in an ambient atmosphere, to form a porous aluminous material having a pore volume of approximately 0.30 cm³/g.

Approximately 500 g of the porous aluminous material is impregnated with a primary additive composition made of 32 g of magnesium nitrate hexahydrate and 6 g of calcium nitrate tetrahydrate dissolved in 125 g of water. The primary additive composition is mixed with the porous aluminous material to affect impregnation of the cations of the precursor salt material (i.e., Ca and Mg). The impregnated material is dried at 95° C. for approximately 12 hours.

After impregnation of the porous aluminous material with the primary additive composition, the shaped, impregnated particles are sintered. Sintering is conducted at a temperature of approximately 1300° C. in a rotary furnace using an ambient atmosphere to form an impregnated abrasive particulate material. The finally-formed abrasive particles are shaped abrasive particulate material in the form of equilateral triangles having sides of a dimension of approximately 1.5 mm and a thickness of approximately 275 microns. The abrasive particulate material is approximately 98.7% alpha alumina impregnated with 1.0 wt % Mg, and 0.3 wt % Ca.

EXAMPLE 2

The shaped abrasive particulate material of Example 1 is formed into a coated abrasive sample (CAS1) according to the following process. A flat, fabric substrate is coated with a make coat of resole phenolic resin via two direct coating method. The shaped abrasive particulate material is placed into the make coat to affix them to the substrate via an electrostatic projection process. The make coat is cured via an oven at a temperature of 175 to 225 F in an atmosphere of air for a duration of approximately 1.5 hours. After forming the make coat, a size coat of resole phenolic resin containing cryolite is formed over the shaped abrasive particulate material and cured via an oven at a temperature of 175-225 F in an atmosphere of air for a duration of 1.5 to 3 hours.

Conventional coated abrasive samples are made using the same process as used to make sample CAS1. Conventional sample 2 (CAC2) utilizes shaped abrasive particulate material formed through the same process as CAS1, except the material is impregnated to have a composition of approximately 99.7 wt % alpha alumina and 0.3 wt % Ca. Conventional sample 3 (CAC3) utilizes shaped abrasive particulate material formed through the same process as CAS1, except the material is impregnated to have a composition of approximately 98.7 wt % alpha alumina and 1.3 wt % Mg. Conventional sample 4 (CAC4) utilizes shaped abrasive particulate material formed through the same process as CAS1, except the shaped abrasive particulate material is not impregnated and has a composition of approximately 100 wt % alumina.

All of the samples were tested according to the following grinding test to determine grinding performance: Dry plunge grind at 4 inch³/min inch on a workpiece of 304 stainless steel, wherein grinding was conducted in intervals to remove 0.2 inch³ of material from the workpiece in each interval. The wheel speed was 7500 sfpm.

Figure 11:
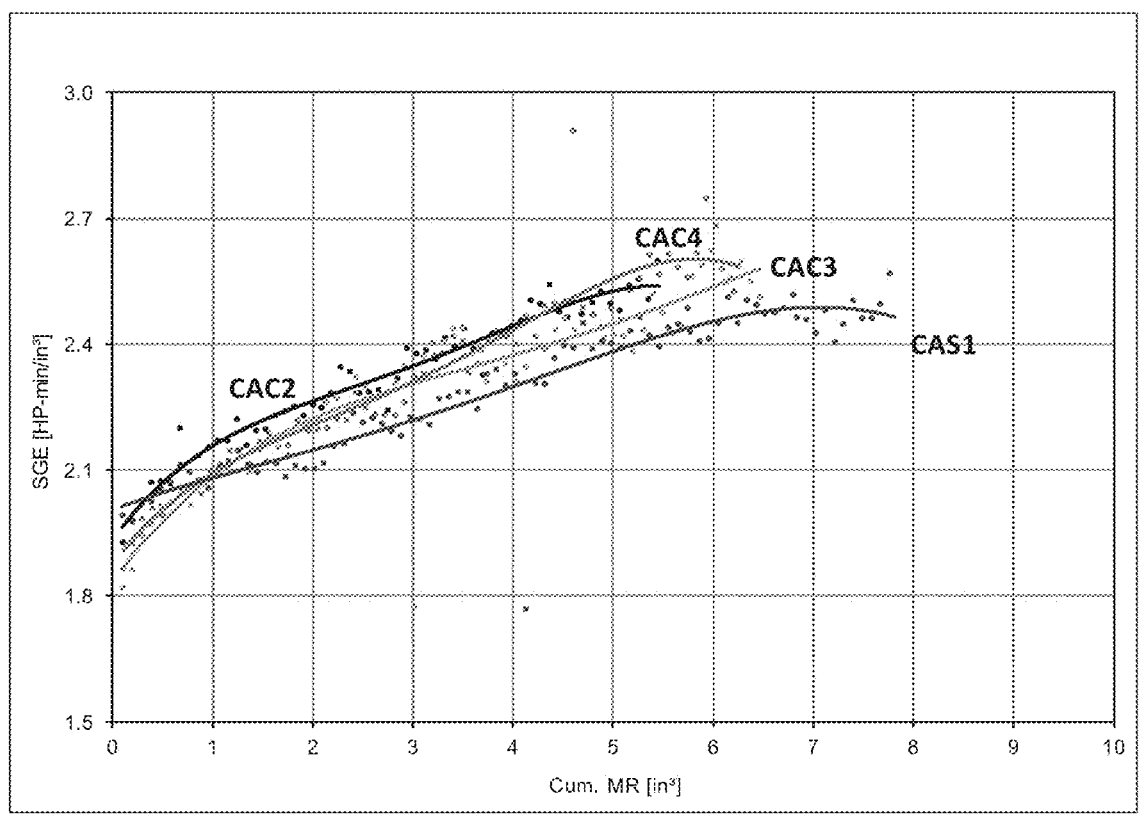
FIG. 11 includes a plot of specific grinding energy versus cumulative material removed for a comparative grinding test conducted with a coated abrasive articles according to an embodiment and conventional coated abrasive articles.

FIG. 11 includes a plot of specific grinding energy (SGE HP min/in³) versus cumulative material removed for the samples (CAS1, CAC2, CAC3, and CAC4) tested according to the grinding test detailed above. As clearly illustrated, the exemplary sample formed according to the embodiments herein demonstrated significant improvements in the grinding performance. As illustrated, sample CAS1 demonstrates improved grinding performance over all conventional samples. The CAS1 demonstrated more consistent SGE over continued use and for a greater content of cumulative material remove. In fact, the CAS1 sample demonstrated an improvement in cumulative material removed of greater than 20% over the closest sample (CAC3) and an improvement of greater than 40% over the CAC2 sample. Furthermore, sample CAS1 demonstrated a lower specific grinding energy over essentially the entire range of cumulative material removed than any of the conventional samples, demonstrating improved efficiency in material removal for a greater amount of cumulative material removed. In short, the exemplary sample CAS1, having a particular combination of Mg and Ca as primary additive components, demonstrated improved grinding capabilities over particles having no impregnated additives, as well as shaped abrasive particles utilizing only Ca or only Mg.

EXAMPLE 3

Hardness and toughness were measured for various samples, including samples of conventional materials including only additives of Ca or Mg, and exemplary samples including a controlled amount of Ca and Mg. Table 1 below demonstrates mechanical characteristics, including hardness, toughness, and friability of samples of the abrasive particles, which are shaped abrasive particles of a triangular two-dimensional shape. The data of Table 1 includes exemplary samples (S1, S2, and S3) according to embodiments herein having controlled amounts of Ca and Mg, and notably, the samples demonstrate suitable hardness, toughness, and friability characteristics. Moreover, and quite unexpectedly, the addition of Ca does not decrease the hardness of the exemplary samples.

Hardness was measured via ASTM 1327. Toughness was measured via the method described in: "A Critical Evaluation of Indentation Techniques for Measuring Fracture Toughness: I, Direct Crack Measurements," G. R. ANSTIS, P. CHANTIKUL, B. R. LAWN, and D. B. MARSHALL, J Am. Cer. Soc. Vol 64, p533.

TABLE 1

|  | S1 | S2 | S3 |
|---|---|---|---|
| MgO | 0.3% | 1% | 3% |
| CaO | 0.3% | 0.3% | 0.3% |
| Ratio | 1 to 1 | 3 to 1 | 10 to 1 |
| Hardness [GPa] | 20.39 | 20.82 | 21.11 |
| Standard Deviation | 0.28 | 0.18 | 0.56 |
| Toughness [MPa*m^(0.5)] | 2.81 | 2.63 | 2.62 |
| Standard Deviation | 0.11 | 0.19 | 0.18 |
| Friability—40 × 2 cycles | 38% | 36% | 45% |

TABLE 2

|  | CS1 | CS2 | S4 | S5 | CS3 | CS4 |
|---|---|---|---|---|---|---|
| MgO |  |  | 1% | 1% | 1% | 0% |
| CaO | 0.3% | 0.9% | 0.3% | 0.9% |  | 0% |
| Hardness [GPa] | 19.21 | 18.09 | 19.88 | 19.83 | 19.94 | 19.86 |
| Standard Deviation | 0.51 | 1.24 | 1.28 | 0.58 | 0.49 | 0.91 |
| Toughness [MPa * m^(0.5)] | 2.44 | 2.77 | 2.35 | 2.46 | 2.22 | 3.22 |
| Standard Deviation | 0.22 | 0.33 | 0.14 | 0.18 | 0.09 | 0.13 |

Table 2 includes exemplary samples (S4 and S5) formed according to embodiments herein having controlled amounts of Ca and Mg, conventional samples (CS1 and CS2) having additions of only Ca, a conventional sample (CS3) having addition of only Mg, and a conventional sample CS4 having no additions of Mg or Ca. As illustrated by the data of Table 2, the addition of Ca only in samples CS1 and CS2 results in an immediate and noticeable decrease in hardness. In fact, conventional sample CS2 has a hardness of approximately 10% less relative to sample S5.

Samples S4 and S5 have significantly greater toughness relative to the conventional sample CS3 including only Mg, and a comparable hardness relative to sample CS3.

It was quite unexpected that such improvement in grinding performance could be achieved, particularly in light of the content of Ca present within the abrasive particulate material. Without wishing to be tied to a particular explanation, it has been theorized that the combination of Mg and Ca in particular ratios can provide measurable, beneficial effects, despite the industries general understanding that even minor amounts of Ca should be avoided in alumina abrasives, since Ca has been shown to have deleterious effects on mechanical stability (see, for example, FIG. 11, sample CAC2) when compared to compositions not including Ca (see, for example, CAC4 of FIG. 11).

The present application represents a departure from the state of the art. While the industry has recognized that calcium may be present within the alumina abrasives, it has generally been the understanding that the amount of calcium should be limited, preferably to amounts less than 0.3 wt %, and more realistically between 0 wt % and 0.1 wt %, because it Ca has been associated with reduced performance of alumina abrasive materials. See, for example, U.S. Pat. No. 5,770,145. By contrast, the inventors of the present application have unexpectedly found that calcium may be used in alumina abrasives, particularly in conjunction with other features described herein, including for example, other primary additive components (e.g., Mg). And in fact, and quite unexpectedly, such compositions can facilitate improved grinding performance. The abrasive particulate materials described herein utilize a combination of features including use of primary additive compositions, secondary additive compositions, ratios of primary additive composition species, maximum and minimum amounts of particular compositions, and specific forming methods, including for example, impregnation processes, which have been shown to provide abrasive particulate materials capable of improved performance.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising: an abrasive particulate material comprising alumina crystals and a primary additive composition impregnated within the abrasive particulate material, the primary additive composition comprising a combination of Mg and Ca, wherein Mg and Ca are present in an additive ratio [Mg:Ca] within a range between about 1:1 and about 10:1, wherein the abrasive particulate material comprises Mg in an amount of at least about 0.1 wt % and not greater than about 2 wt % based on the total weight of the abrasive particulate material and further comprising at least about 0.2 wt % Ca for the total weight of the abrasive particulate material, and wherein the abrasive particulate material is free of a rare earth oxide.

2. The abrasive article of claim 1, wherein the alumina crystals comprise alpha alumina.

3. The abrasive article of claim 1, wherein the abrasive particulate material comprises Ca in an amount of at least about 0.25 wt % and not greater than about 2 wt % based on the total weight of the abrasive particulate material.

4. The abrasive article of claim 1, wherein the abrasive particulate material comprises Mg in an amount of at least about 0.1 wt % and not greater than about 1.5 wt % based on the total weight of the abrasive particulate material.

5. The abrasive article of claim 1, wherein the abrasive particulate material comprises not greater than about 8 wt % of the primary additive composition.

6. The abrasive article of claim 1, wherein the additive ratio [Mg:Ca] is within a range between about 1:1 and about 9:1.

7. The abrasive article of claim 1, wherein the abrasive particulate material comprises a crystallinity content of at least about 90 wt %.

8. The abrasive article of claim 1, wherein the abrasive particulate material comprises a contour, and wherein the contour comprises a polyhedral shape.

9. The abrasive article of claim 1, wherein the abrasive particulate material is part of a fixed abrasive.

10. The abrasive article of claim 1, wherein the additive ratio [Mg:Ca] is within a range between about 3:1 and about 10:1.

11. The abrasive article of claim 1, wherein the abrasive particulate material comprises shaped abrasive particles selected from the group consisting of triangular, rectangular, pentagonal, hexagonal, conical, helical, elliptical, elongated shape, and any combination thereof.

12. The abrasive article of claim 11, wherein the shaped abrasive particles have a triangular shape.

13. An abrasive article comprising: an abrasive particulate material consisting essentially of alumina crystals and a primary additive composition impregnated within the abrasive particulate material, the primary additive composition consisting essentially of a combination of Mg and Ca, wherein Mg and Ca are present in an additive ratio [Mg:Ca] within a range between about 1:1 and about 10:1, wherein the abrasive particulate material comprises Mg in an amount of at least about 0.1 wt % and not greater than about 2 wt % based on the total weight of the abrasive particulate material and further comprising at least about 0.2 wt % Ca for the total weight of the abrasive particulate material.

14. The abrasive article of claim 13, wherein the alumina crystals comprise alpha alumina.

15. The abrasive article of claim 13, wherein the abrasive particulate material comprises Ca in an amount of at least about 0.25 wt % and not greater than about 2 wt % Ca based on the total weight of the particulate material.

16. The abrasive article of claim 13, wherein the abrasive particulate material comprises Mg in an amount of at least about 0.1 wt % and not greater than about 1.5 wt % based on the total weight of the abrasive particulate material.

17. The abrasive article of claim 13, wherein the additive ratio [Mg:Ca] is within a range between about 1:1 and about 9:1.

18. The abrasive article of claim 13, wherein the additive ratio [Mg:Ca] is within a range between about 3:1 and about 10:1.

19. The abrasive article of claim 13, wherein the abrasive particulate material comprises shaped abrasive particles having a shape selected from the group consisting of triangular, rectangular, pentagonal, hexagonal, conical, helical, elliptical, elongated, and a combination thereof.

20. The abrasive article of claim 19, wherein the shaped abrasive particles have a triangular shape.

21. The abrasive article of claim 13, wherein the abrasive particulate material is part of a fixed abrasive.

\* \* \* \* \*